J. W. DIXON.
PNEUMATIC WHEEL.
APPLICATION FILED APR. 5, 1921.

1,411,879. Patented Apr. 4, 1922.

J. W. Dixon
INVENTOR

BY Victor J. Evans
ATTORNEY

UNITED STATES PATENT OFFICE.

JOSEPH W. DIXON, OF CONNELLSVILLE, PENNSYLVANIA.

PNEUMATIC WHEEL.

1,411,879.  Specification of Letters Patent.  Patented Apr. 4, 1922.

Application filed April 5, 1921. Serial No. 458,824.

*To all whom it may concern:*

Be it known that I, JOSEPH W. DIXON, a citizen of the United States, residing at Connellsville, in the county of Fayette and State of Pennsylvania, have invented new and useful Improvements in Pneumatic Wheels, of which the following is a specification.

This invention relates to wheels for automobiles and similar vehicles, and more particularly to a pneumatic wheel of the punctureless type.

One of the main objects of the invention is to provide a wheel of the character stated of comparatively simple construction and operation possessing great strength and durability. A further object is to produce a wheel which may be readily assembled or disassembled and in which the cushioning elements are effectively protected. Further objects will appear from the detailed description.

Figure 1:
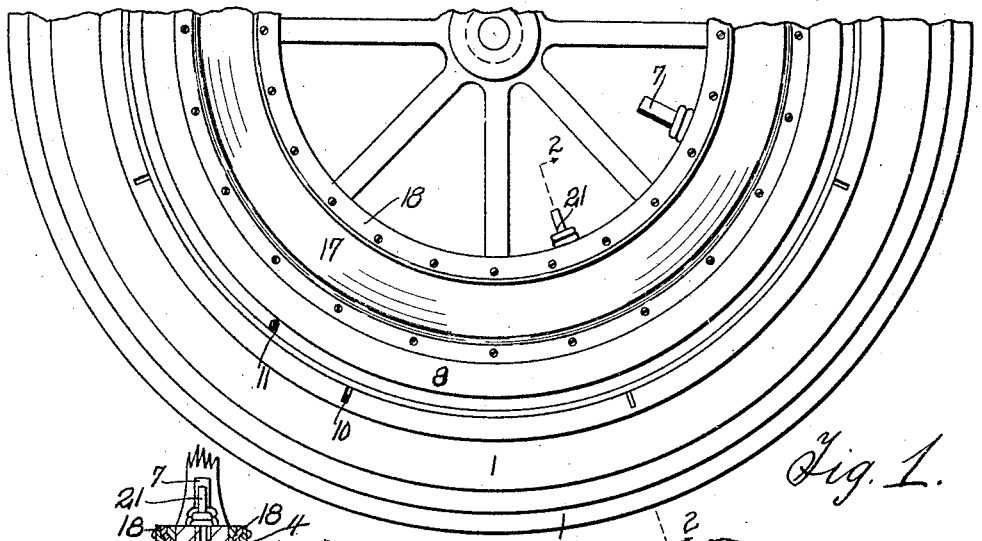
Figure 1 is a fragmentary side view of a wheel constructed in accordance with my invention.
Figure 2:
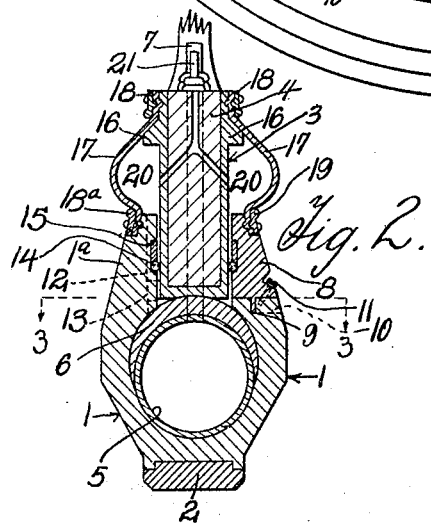
Figure 2 is a section taken substantially on line 2—2 of Figure 1.
Figure 3:
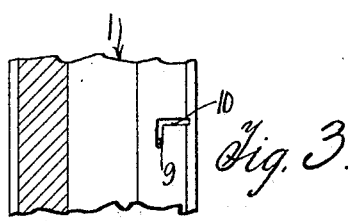
Figure 3 is a section through the tire casing taken substantially on line 3—3 of Figure 2.
Figure 4:
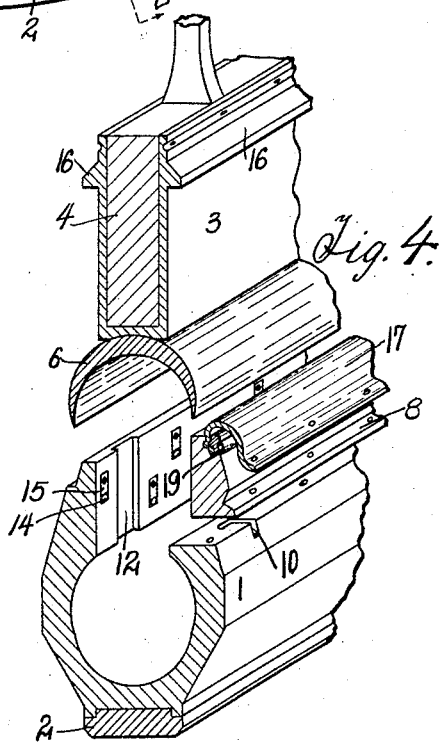
Figure 4 is a fragmentary detail showing the parts of the device disassembled or separated.

Main casing 11 is formed by casting of iron or other suitable material and conforms in shape and appearance to tire casings such as are commonly used. The casing 1 is provided at its tread portion with a groove which receives a tread element 2 of rubber or other suitable material. Casing 1 is provided at one side with an inwardly extending portion 1ª which is positioned closely adjacent to one side of a steel casing or shoe 3 which encloses felloe 4 of the wheel. A rubber tube 5 is mounted within casing 1 in the usual manner, a filler 6 of suitable type being positioned about the inner portion of tube 5 and confined between the same and the outer face of shoe 3. This tube is inflated in the usual manner by means of a valve tube 7 projecting inwardly through felloe 4.

A main locking ring 8 is positioned at the opposite side of felloe 4 from portion 1ª of casing 1 and is provided on its outer face with a plurality of spaced pins 9 which engage into bayonet slots 10 provided in the inner face of casing 1. By means of this ring, which is locked in operative relation to the casing by a set screw 11, the casing may be readily secured in position about the felloe. By removing ring 8 the casing may be moved across the felloe in the direction of portion 1ª of the casing so as to be readily withdrawn or removed from the wheel. To prevent any turning movement between the felloe and the casing portion, 1ª is provided in its inner face with a recess 12 which receives a lug 13 projecting from the lateral face of the felloe casing or shoe 3. A plurality of bearing balls 14 are mounted in the inner faces of portion 1ª of casing 1 and of ring 8, these balls being confined by suitable plates 15 and contacting with the lateral faces of the felloe shoe so as to reduce friction during movement of casing 1 relative to the felloe to a minimum.

Felloe shoe 3 is provided adjacent to the inner edge of each arm with an outwardly projecting shoulder 16 the outer face of which is inclined outwardly laterally and radially of the wheel. A fabric strip or member 17 is secured at its upper edge by means of a securing ring 18 to the felloe shoe, this ring and the shoe being provided with a co-operating groove and bead which serve to effectually secure the inner edge of member 17 and to provide an air tight closure. The outer edge of one of the members 17 is similarly secured by a ring 18ª to the inner edge of portion 1ª of casing 1, the outer edge of the other member 17 being secured by a ring 19 to locking ring 8. The securing rings are held in position by screws, or in any other suitable manner, it being desirable that the means for securing ring 19 be such as to permit ready removal of this ring in the event that it is desired or necessary to remove locking ring 8. The fabric members 17 are preferably rubberized, or treated in any other suitable manner to render them air tight. These members form supplemental air chambers 20 which may be inflated by means of inflating tube 21 of substantially Y shape which communicates with the respective chambers, this tube projecting through the inner face of felloe 4. The members 17 and tube 15 when inflated provide cushioning members which serve to effectively absorb all shocks or jars due to obstructions encountered during travel of the vehicle. The normal distance between shoulders 16 and ring 8 and portion 1ª of casing 1 is less than the distance from the outer face of felloe 4 and the inner edges of portion 1ª and ring 8. This permits relatively great movement of casing 1 about felloe 4 radially thereof while effectually eliminating all possibility of the casing becoming accidentally detached from the felloe. This movement is cushioned by the air confined within spaces 20 by members 17 thus providing very effective shock absorbing means. By constructing the wheel in the manner illustrated and described I produce a tire which it is practically impossible to puncture, this tire possessing great strength so as to be capable of supporting heavy loads while also being of comparatively simple construction and presenting a neat appearance.

What I claim is:—

1. In a wheel of the character described, a felloe, a rigid casing surrounding said felloe and mounted upon the same for movement radially of the felloe, means for limiting radial movement of said casing, a cushion member confined between the felloe and the casing, strips forming inflatable members connecting the inner edges of the casing to the inner edges of the felloe, and means for inflating said members.

2. In a wheel of the character described, a felloe, a rigid casing surrounding said felloe and mounted upon the same for relative movement radially of the felloe, a tube within said casing, a filler positioned between the felloe and the tube, means for inflating said tube, means for limiting radial movement of the felloe, strips forming inflatable members connecting the inner edges of the casing to the sides of the felloe adjacent to the inner edges thereof, and means for inflating said members.

In testimony whereof I affix my signature.

JOSEPH W. DIXON.